May 28, 1946.  P. K. SAUNDERS  2,401,112
FLUID CONTROLLING VALVE
Original Filed Aug. 17, 1938  2 Sheets-Sheet 1
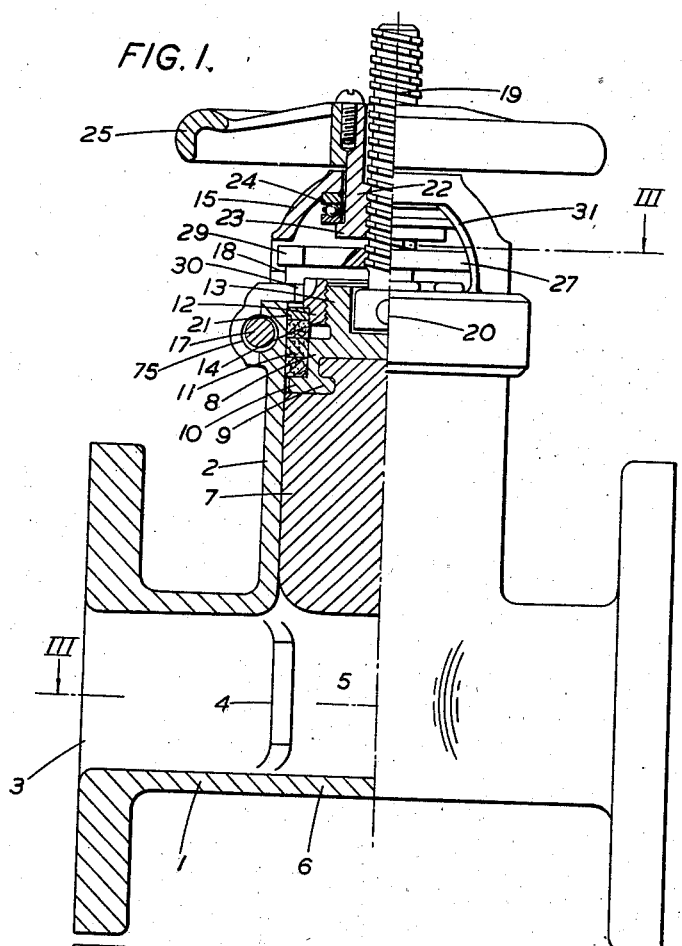
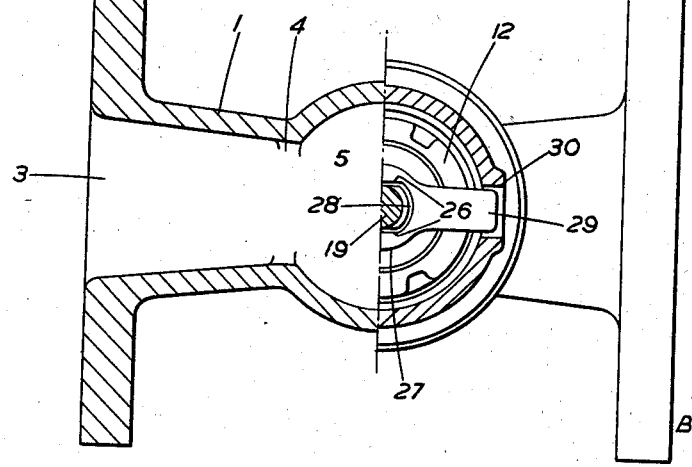
INVENTOR
Philip K. Saunders,
BY
ATTORNEY.

May 28, 1946.　　　　P. K. SAUNDERS　　　　2,401,112
FLUID CONTROLLING VALVE
Original Filed Aug. 17, 1938　　2 Sheets-Sheet 2
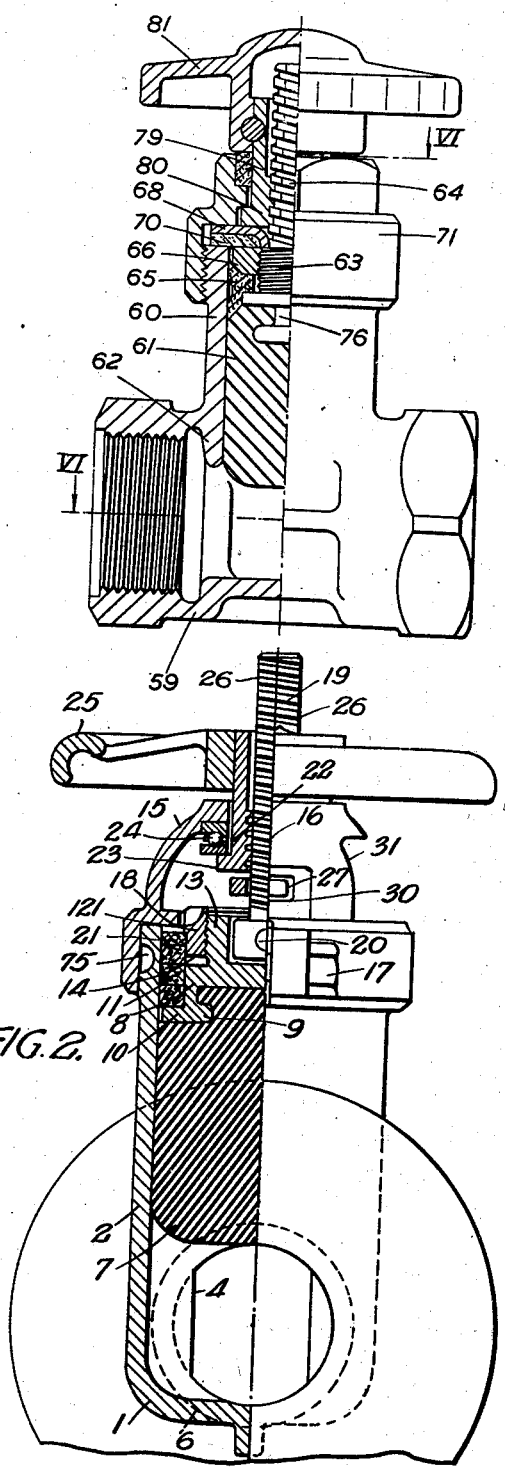
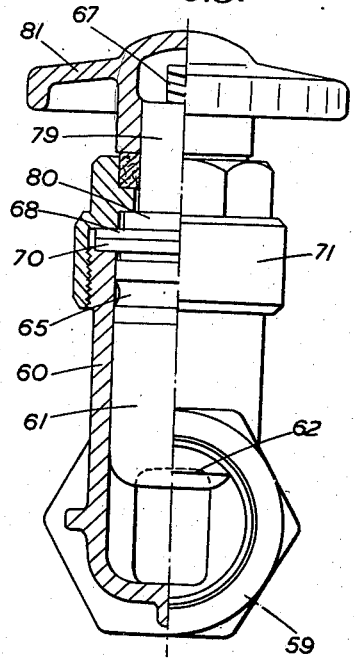
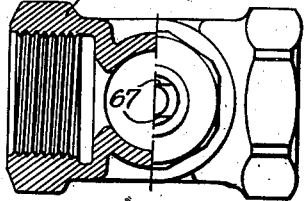
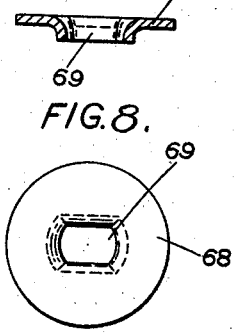
INVENTOR,
Philip K. Saunders,
BY
Simon Brodie
ATTORNEY.

Patented May 28, 1946

2,401,112

UNITED STATES PATENT OFFICE 2,401,112

FLUID CONTROLLING VALVE

Philip Keith Saunders, Mamaroneck, N. Y.

Original application August 17, 1938, Serial No. 225,436, now Patent No. 2,290,251, dated July 21, 1942. Divided and this application March 16, 1942, Serial No. 434,939. In Great Britain August 20, 1937

7 Claims. (Cl. 251—55)

This invention relates to fluid control valves for controlling the flow through the valve of liquids, gases, sludges and the like of the type in which a closure member is moved transversely across the bore of the valve. This application is a division of application Serial No. 225,436, filed August 17, 1938, now Patent No. 2,290,251, issued July 21, 1942.

A principal object of the invention is to provide such a valve having a straight through bore without the usual pocket or recess with which the closure member cooperates as in the standard form of gate valve. Such a recess collects solid matter when the valve is controlling a sludge and thus eventually interferes with the proper functioning of the valve. Furthermore, when such a valve is controlling milk, beer or similar liquids, a small quantity of liquid is trapped in the recess and may putrefy.

A further object is to provide such a valve with a closure member of rubber or other resilient material and to construct the valve in such a way that the surface of the closure member is not rubbed on or dragged across the surface of the bore but only moved normally to it while in contact with the bore.

A still further object is to provide an inexpensive, compact, robust and reliable valve from which satisfactory results will be obtained when controlling any kind of fluid.

With these and other objects in view the present invention consists primarily of a valve body having a substantially straight through bore with a substantially flat or continuously aligned (in the direction of the axis of the bore) wall on one side of the bore and a port in the other side of the bore, a resilient plug of cross section corresponding to the port and slidably mounted for movement through it, and valve operating means for moving the plug from a position retracted through the port leaving the bore substantially unimpeded to a position compressed against the opposite side of the bore and thereby expanded to seal both bore and port.

Usually the plug is cylindrical and of greater diameter than that of the bore and is slidably mounted within a cylindrical chamber mounted transversely on the valve body so as to communicate with the bore through the port. The chamber may be either integral with the valve body or a separate member.

The resilient plug is usually made of hard rubber having a hardness comparable with that of a soft wood such as deal, but in some cases may be composite and reinforced.

Actuation of the valve may be effected manually by screw mechanism mounted in a domed cover or bonnet fitted to the top of the chamber accommodating the plug.

These and other features of the invention are hereinafter more fully described with reference to the accompanying drawings, in which—

Fig. 1 is an elevation half in section of a valve in accordance with the invention.

Fig. 2 is another elevation half in section at right angles to that in Fig. 1.

Fig. 3 is a section on the line III—III of Fig. 1.

Figs. 4 and 5 are views similar to Figs. 1 and 2 of a further modification of the invention.

Fig. 6 is a section on the line VI—VI of Fig. 4.

Figs. 7 and 8 are detail views of the keying plate used in the construction shown in Figs. 4, 5 and 6.

Referring now to Figs. 1 to 3, the valve illustrated therein has a body 1 and a transverse cylindrical chamber 2 cast in one piece. The bore of the body merges gradually from circular cross section at the ends 3 to a circular cross section with flat sides at the points 4 where the bore enters a transverse cylindrical part 5 which is a continuation of the chamber 2. The wall 6 of the bore opposite the chamber is flat. Thus along the centre line of the bore this wall is continuously aligned from one end of the body to the other. Conveniently the diameter of the chamber 2 is 1¼ times the diameter of the ends 3 of the bore.

The bore of the transverse chamber 2 is machined and within this chamber is slidably mounted a cylindrical resilient plug 7 formed of a rubber compound having a hardness comparable with that of a soft wood such as deal. The plug is vulcanised to a metal cap 8 with a suitably shaped depending and inwardly projecting flange 9 to secure it. This flange also projects outwardly at 10. A gland between the plug 7 and chamber 2 is formed by a packing 11 consisting of three packing rings secured between this outwardly projecting flange 10 and an annular washer 21 which is held in position by a castellated nut 12 screwed on to a threaded boss 13 on top of the cap 8. The nut 12 has a boss 14 which projects through the washer 21 so as to form a surface against which at least a part of the packing 11 will abut.

On top of the chamber is attached a domed casing or bonnet 15 which carries the valve actuating gear. This bonnet 15 has a radial split 16 and is clamped in position upon the chamber by means of a tangential bolt 17 which draws parts of the bonnet 15 on the opposite sides of the split 16 together. This bolt 17 also engages an external circumferential groove 75 in the chamber. The bonnet 15 has an inwardly projecting flange 18 against which the top of the chamber 2 abuts. This flange projects inwards slightly beyond the inside surface of the chamber 2, and, therefore, provides a shoulder against which the washer 21 securing the packing gland 11 will abut, thus limiting movement of the plug 7 in the opening direction.

The plug 7 is moved transversely across the bore by means of an externally threaded spindle 19 pivotally attached at 20 to the cap 9. This spindle 19 is engaged by an internally threaded bush 22 which is rotatably mounted centrally in the top of the bonnet 15 and prevented from endwise movement thereto by an external collar 23 on its inner end between which and the bonnet 15 there is a thrust race 24, and a hand wheel 25 keyed to its outer end. The spindle has flats 26 on opposite sides and is prevented from rotation relatively to the bonnet 15 by means of a keying yoke 27 with an aperture 28 of similar cross section to that of the spindle 19 and having arms 29 which are secured in suitably diametrically opposite slots 30 in the bonnet 15.

In operation the plug may be fully retracted so that its end is flush with the wall of the bore of the valve body 1 surrounding the port communicating with the chamber 2. In this position the washer 21 securing the packing gland 11 will be pressed against the limiting flange 18 on the bonnet 15, thereby tightening the gland and relieving the load on the castellated nut 12, which accordingly may be tightened by means of a suitable implement through a convenient aperture 31 provided in the side of the bonnet 15. Due to the presence of the boss 14 on the castellated nut 12 against which part of the gland abuts, there is no danger, on account of vibration set up in the pipe, of the nut 12 becoming loose when the valve is fully open.

To close the valve the hand wheel 25 is turned, so rotating the bush 22 and moving the spindle 19 in an axial direction and with it the plug 7. When the plug contacts with the flat wall 6 of the bore opposite the chamber further movement of the actuating wheel compresses the plug 7 axially and expands it radially, thus sealing the bore of the valve body 1 and at the same time expanding the part of the plug 7 within the chamber 2 into contact with its wall and thus also sealing the port between the valve body 1 and chamber 2.

The modification illustrated in Figs. 4 to 8 is designed for the control of compressed air. The valve body 59 has a transverse cylindrical chamber 60, in which is slidably mounted a resilient hard rubber cylindrical plug 61. In order to make the valve as compact as possible, the plug 61 is shorter relatively to the bore of the valve body 59 than in the other valves illustrated in the drawings. As a result the wall of the chamber 60 is extended at 62 a short distance into the bore of the valve, so that in the fully open position as shown the bore of the valve has the form of a venturi.

The plug 61 is vulcanised to a cap 76 which is integral with the screwed boss 63 and a threaded spindle 64. A gland between the plug 61 and the chamber 60 is provided by a double cup leather 65 having the form of an annulus of T section radially. This cup leather is secured by a retaining ring 66 screwed on to the boss 63. The spindle 64 has flat sides 67 and is prevented from rotation relatively to the body by a keying plate 68 (see Figs. 7 and 8) made from an annular sheet of metal with a central aperture 69 of cross section corresponding to that of the spindle 64 and formed by bending down the surrounding edge of a smaller aperture in the metal blank from which the plate is made. An annular fibre washer 70 and this plate 68, whose turned down edge forms a protection for the edge of the central aperture of the washer 70, are placed upon the open end of the chamber 60 with the spindle 64 passing through them. An internally screwed cover or bonnet 71 screwed on to the end of the chamber clamps the washer 70 and plate 68 against the end of the chamber 60.

An internally threaded bush 79 for co-operation with the spindle 64 is rotatably mounted in the top of the bonnet 71 and is endwise located by means of a collar 80 on it bearing against the inside of the bonnet 71 and a hand wheel 81 keyed to the projecting end of the bush.

When the valve is in the fully open position as shown in Fig. 4, the ring 66 is pressed against the fibre washer 70 so preventing any possibility of leakage past the gland when the valve is in this position.

What I claim is:

1. Valve actuating mechanism for moving a cylindrical valve closure member transversely across the bore of a valve body, comprising a bonnet, a threaded spindle of non circular cross section centrally mounted on said closure member, an internally threaded bush co-operating with said spindle axially located but freely rotatably mounted centrally in and projecting through said bonnet, and a keying yoke having a hole of similar cross section to that of the spindle and located with its ends secured at diametrically opposite points in said bonnet with the spindle passing through said hole.

2. Valve actuating mechanism for moving a cylindrical valve closure member transversely across the bore of a valve body, comprising a bonnet having diametrically opposite apertures adjacent its periphery, a threaded spindle of non-circular cross section centrally mounted on said closure member, an internally threaded bush co-operating with said spindle axially located but freely rotatably mounted centrally in and projecting through said bonnet, and a keying yoke having a hole of similar cross section to that of the spindle and located with its ends respectively within said apertures and the spindle passing through said hole.

3. Valve actuating mechanism for moving a cylindrical valve closure member transversely across the bore of a valve body, comprising a bonnet, a threaded spindle of non-circular cross section pivotally mounted on said closure member about an axis perpendicular to the axis of the spindle, an internally threaded bush co-operating with said spindle axially located but freely rotatably mounted centrally in and projecting through said bonnet, and a keying yoke having a hole of similar cross section to that of the spindle and located with its ends secured at diametrically opposite points in said bonnet with the spindle passing through said hole.

4. Valve actuating mechanism for moving a cylindrical valve closure member transversely across the bore of a valve body, comprising a bonnet having diametrically opposite apertures adjacent to its periphery, a threaded spindle of non-circular cross section pivotally mounted on said closure member about an axis perpendicular to the axis of the spindle, an internally threaded bush co-operating with said spindle axially located but freely rotatably mounted centrally in and projecting through said bonnet, and a keying yoke having a hole of similar cross section to that of the spindle and located with its ends respectively within said apertures and the spindle passing through said hole.

5. A fluid controlling valve, comprising a valve body with a substantially straight through bore and a transverse cylindrical chamber with its axis perpendicular to the axis of the bore, a resilient plug slidably mounted within said chamber, a metal cap mounted on said plug and having a projecting screwed boss and beyond it a threaded spindle of non-circular cross section smaller than that of the boss, an annular packing of T section radially, a nut screwed on said boss and retaining said packing, an annular fibre washer of greater external diameter than said chamber, a keying plate with a central non circular aperture similar to the cross section of the spindle with the periphery of the aperture bent down, a bonnet mounted on the open end of said chamber and retaining said washer and said keying plate against the end of said chamber, and valve actuating means mounted in said bonnet for moving said plug from a position within the chamber to a position compressed against the opposite side of said bore.

6. Valve actuating mechanism for moving a cylindrical valve closure member transversely across the bore of a valve body, comprising a bonnet, a threaded spindle centrally mounted on said closure member, an internally threaded bush co-operating with said spindle axially located but freely rotatably mounted centrally in and projecting through said bonnet, and a keying yoke having a hole of similar cross section to that of the spindle and located with its ends secured at diametrically opposite points in said bonnet with the spindle passing through said hole, said keying yoke acting on said spindle to keep said spindle and plug from rotating.

7. A fluid controlling valve, comprising a valve body with a substantially straight through bore, a transverse cylindrical chamber with its axis perpendicular to the axis of the bore, a resilient plug slidably mounted within said chamber, a bonnet, a threaded spindle of non-circular cross section centrally mounted on said plug, a keying yoke having an aperture similar to the cross section of the spindle, and keying said spindle to keep it from rotating, and an internally threaded bush co-operating with said spindle axially located but freely rotatably mounted in and projecting through said bonnet.

PHILIP KEITH SAUNDERS.